Oct. 28, 1969 R. W. QUALLEY ET AL 3,474,720
APPARATUS FOR CONDITIONING AIR
Filed March 1, 1968 2 Sheets-Sheet 1

INVENTORS
RAY W. QUALLEY
EVERETT L. SARTAIN

ATTORNEYS

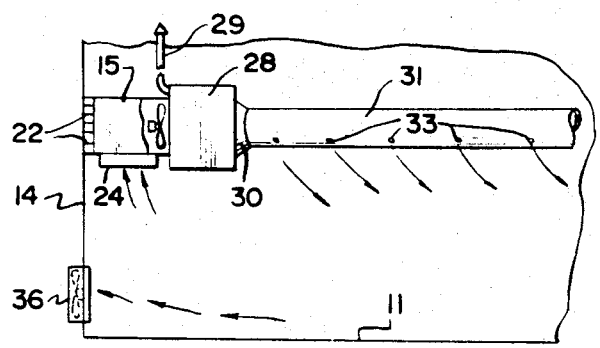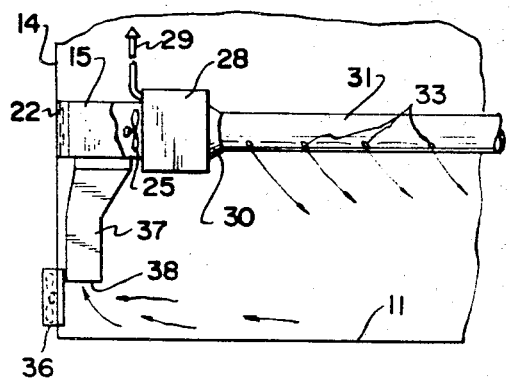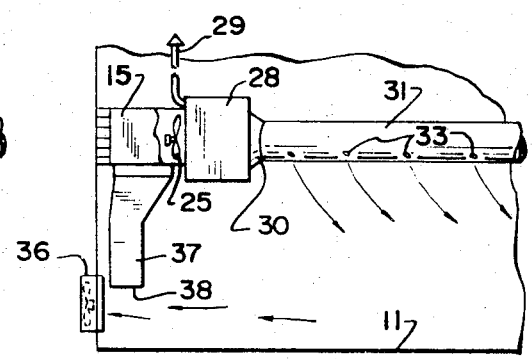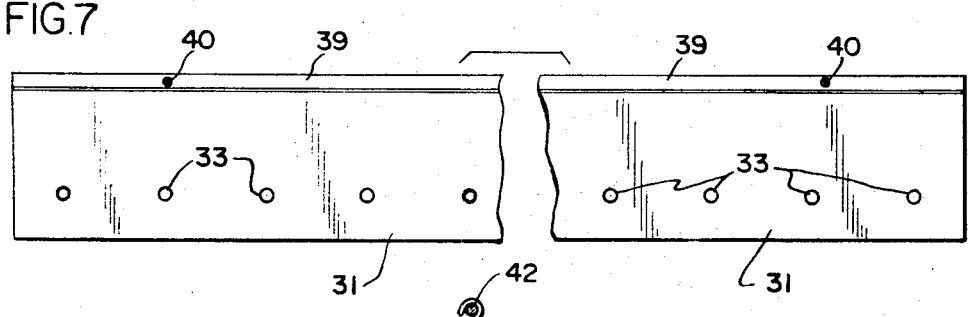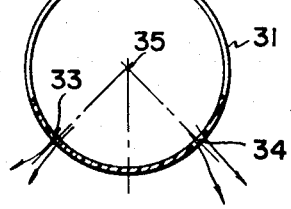

United States Patent Office 3,474,720
Patented Oct. 28, 1969

3,474,720
APPARATUS FOR CONDITIONING AIR
Ray W. Qualley and Everett L. Sartain, Racine, Wis., assignors to Modine Manufacturing Company, a corporation of Wisconsin
Filed Mar. 1, 1968, Ser. No. 709,540
Int. Cl. F24f *13/04, 13/06*
U.S. Cl. 98—33                                         4 Claims

ABSTRACT OF THE DISCLOSURE

Apparatus for conditioning the air of a room such as a greenhouse in which fresh air can be drawn in from the exterior when desired and room air drawn from the room and the two mixed in a mixing chamber before being forced through a heater where the mixture can be heated if desired and from there forced through a distributing duct and back into the room. The apparatus provides structure so that only room air can be drawn through the mixing chamber and forced through the heater and the duct when recirculation of room air only is desired.

---

The apparatus of this invention for conditioning the air of a space means such as a room, of which a greenhouse or the like is a good example, uses a heater which may be activated when desired to heat either incoming exterior fresh air from the exterior of the room, recirculated air from the space or room or a mixture of fresh air and room air before the air is conveyed back to the room. In addition, the apparatus includes a mixing chamber ahead of an air circulating blower means in which fresh air and room air is thoroughly mixed when desired before being forced through the heater and the room circulating duct. This chamber preferably is positioned between the top of the room and the bottom with a room air entrance opening at the bottom of the chamber so that the relatively cooler bottom room air is primarily drawn into the chamber while the top hotter air is blocked from direct passage into the chamber by reason of a solid top wall in the chamber. In one embodiment a depending inlet duct is employed extending down from the room air inlet of the chamber to the lower areas of the room so that the inlet room air is drawn from the coolest part of the room. The mixing chamber has the fresh air inlet controlled by a valve such as movable shutters.

The invention will be described as related to the embodiments shown in the accompanying drawings. Of the drawings:

FIGURE 4 is a view similar to FIGURE 3 but illustrating ventilating only of the room.

FIGURE 5 is a view similar to FIGURE 3 but illustrating a second embodiment of the invention.

FIGURE 6 is a view similar to FIGURE 4 but also illustrating this second embodiment.

FIGURE 7 is a fragmentary side elevational view of an inflated flexible duct usable in this invention.

FIGURE 8 is a sectional view taken substantially along line 8—8 of FIGURE 7 illustrating the relative location of the exit openings in the duct and a way of suspending the duct.

Figure 1:
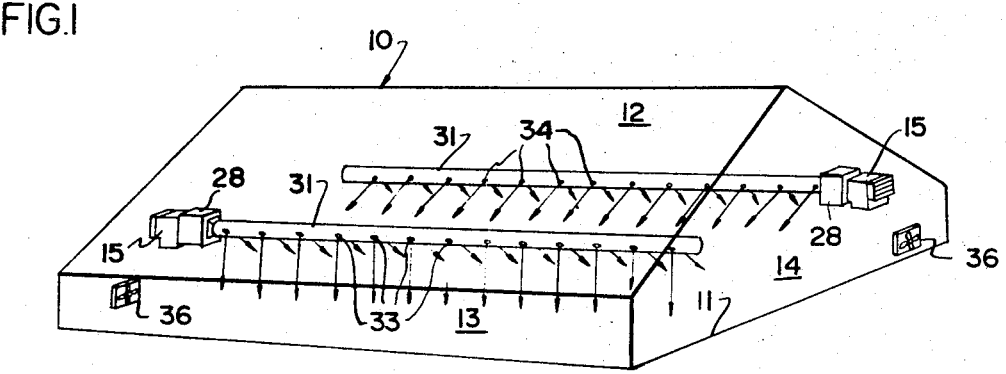
FIGURE 1 is an isometric view of a greenhouse employing a pair of apparatus of the invention because of the size of the greenhouse and with the greenhouse walls omitted for clarity of illustration.

In the embodiment of FIGURES 1–4 there is illustrated a customary greenhouse 10 with the bottom 11, top 12, side 13 and end 14 walls being illustrated only schematically so as to avoid hiding structural features of the apparatus for conditioning the air within the greenhouse.

This apparatus comprises an enclosure 15 preferably of metal forming a mixing chamber 16 on the interior. Each enclosure, where more than one is used as in FIGURE 1, is elevated above the room bottom 11 but is beneath the room top 12. The enclosure itself has a bottom 17, a pair of opposite lateral side walls 18, a top wall 19 and a pair of end walls 20 and 21.

Figure 2:
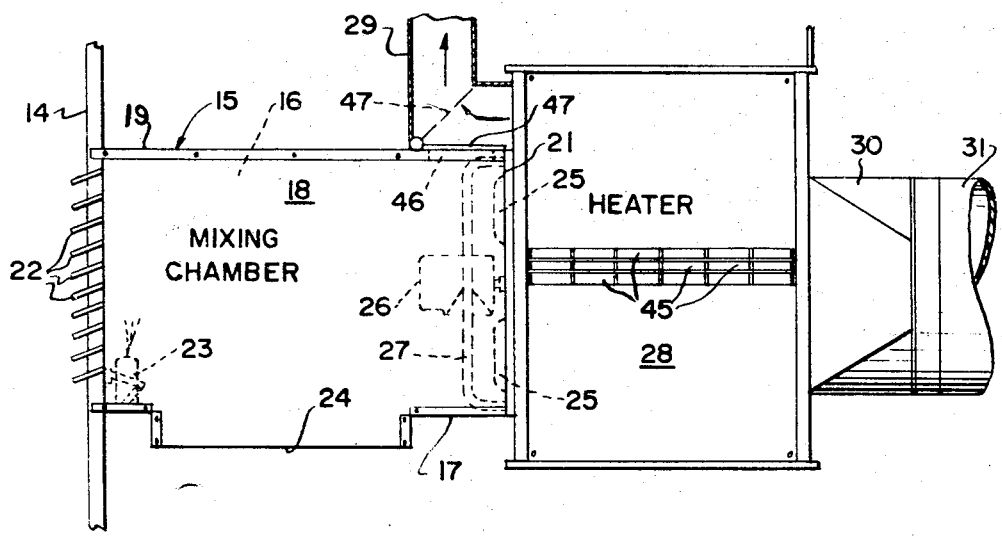
FIGURE 2 is a side elevational view of the mixing chamber and heater end of the apparatus with the motorized blower being shown in fragmentary side elevation in dotted lines.

One end wall 20 is located adjacent a greenhouse and wall 14 while the other end wall 21 is spaced therefrom as shown in FIGURE 2. Thus, the enclosure 15 has generally the shape of a rectangular box with top, bottom, sides and ends.

The end wall 20 of the enclosure is provided with a fresh air inlet means in the form of an opening through the greenhouse end wall 14 with flow through this opening into the mixing chamber 16 being controlled by a valve such as shutters 22 which may be motorized as indicated at 23 in FIGURE 2.

The mixing chamber 16 within the enclosure 15 is provided with room air inlet means between the chamber end walls 20 and 21. In the embodiments illustrated this room air inlet means is in the form of an opening 24 in the chamber bottom wall 17. The chamber top wall 19 is substantially solid so as to preclude direct flow of room air from above the chamber into the chamber. This direct flow is better precluded by the solid side walls 18 in the embodiment illustrated.

The other end wall 21 of the enclosure chamber 16 that is opposite the intake end wall 20 is provided with an air outlet opening in which is positioned an air blower means in the form of a fan 25 operated by a motor 26 with both being supported within the chamber 16 by an open frame 27. The blower or fan 25 is arranged to force air from the chamber 16 to the right as shown in FIGURE 2.

Adjacent the enclosure 15 in which the chamber 16 is located and on the downstream side of the fan 25 there is positioned an air heater 28 which is preferably but not necessarily a gas fired heater for economic and ease of control reasons. When it is such a combustion heater the opposite sides are provided with air inlet openings 45. The heater is provided with a stack 29 for the gaseous products of combustion leading to the exterior of the greenhouse 10. There is also an opening 46 leading from the stack 29 to the mixing chamber 16 on the intake side of fan 25 to supply carbon dioxide rich atmosphere to the greenhouse 10 as desired. Flow through the opening 46 is controlled by a damper 47 movable between the normally closed position of FIGURE 2 and the open position shown in dotted line in this figure.

The air heater 28 is provided with an air outlet means in the form of a short horizontal pipe 30 in the illustrated embodiment. Connected to this pipe 30 to receive air from the fan 25 is an elongated air distributing duct 31 that has a closed outer end 32 on the end opposite the pipe 30. This duct 31 is preferably constructed of flexible plastic and is held in fully open position as shown in FIGURES 7 and 8 when subjected to internal air pressure when subjected to the fan 25.

In order to distribute air from each duct 31 substantially efficiently into the interior of the greenhouse, there are provided rows of openings 33 on one bottom side of the duct and similar openings 34 on the other side. It is preferred that each row of openings 33 and 34 be located in a lower quadrant of the inflated duct 31. One ideal arrangement has been found to arrange each opening 33 or 34 at a 45° angle from the horizontal taken from the center 35 of the duct. Thus this angle should be substantially the same as the angle of the top walls 12 of the greenhouse.

Each unit of air conditioning apparatus, as described, is preferably used with an exhaust fan 36 of the customary motor-fan type and located in the side or end wall of the greenhouse.

As can be seen from the above description, the apparatus of this invention when in use provides great flexibility in ventilating or circulating air within a space such as a greenhouse. Thus, when the external air intake shutters 22 are closed and the exhaust fan 36 is inoperative the blower fan 25 serves to recirculate air through the greenhouse. When this is done, the rotating fan draws air into the enclosure 15 through the bottom opening 24. The fan 25 then forces this air under pressure to the right in FIGURE 3 through the heater 28 which may be inactivated in the customary manner when no heat is desired. From the heater 28 this air is forced through the air distributing duct 31 and back into the room, preferably downwardly toward the room bottom 11 as illustrated. This recirculation is continued in the same manner as long as desired.

FIGURE 4 illustrates ventilating of the greenhouse by admitting fresh air through the now open shutters 22 into the mixing chamber enclosure 15 while exhausting air from the bottom of the greenhouse through the now activated exhaust fan 36. Here again, heat may or may not be added to the entering air depending upon whether or not the operator activates the heater 28. Even in this embodiment some air will be recirculated by way of the open bottom 24 of the enclosure 15.

Figure 3:
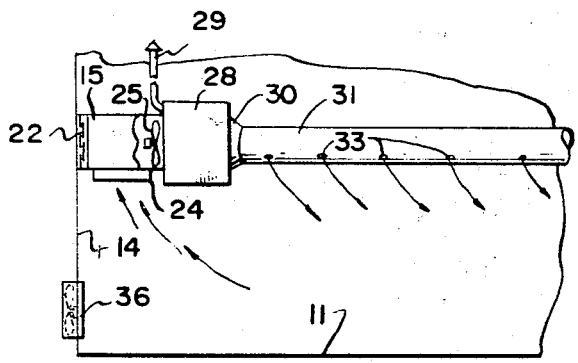
FIGURE 3 is a fragmentary side elevational view illustrating the apparatus of the invention where room air is recirculated and heated.

FIGURE 5 is substantially the same as FIGURE 3 in its operation but in this embodiment there is provided an elongated air inlet duct 37 extending downwardly from the bottom opening 24 in the mixing chamber enclosure 15 and with an open intake end 38 on the bottom of the duct and nearer the bottom 11 of the greenhouse than to the enclosure 15. FIGURE 5, like FIGURE 3, illustrates the conditions when this embodiment is used for recirculation of greenhouse air with or without added heat.

FIGURE 6 is the same as the embodiment of FIGURE 5 but the conditions here are the same as those in FIGURE 4 to illustrate ventilating the greenhouse.

FIGURES 7 and 8 illustrate one way that the air distributing duct may be suspended within the greenhouse. In this embodiment the top of the duct 31 is formed as an outwardly extending flange 39 provided with spaced grommets 40 therealong. Each grommet is adapted to receive a hook 41 for suspending the duct 31 from a horizontal wire 42.

In this invention very efficient mixing of outside air and room air is accomplished when the shutters 22 are open to admit outside air. This is true because all of the preliminary mixing takes place in the enclosure chamber 16 which is enclosed on the top and sides. Furthermore, room air is admitted to the chamber 16 through a bottom opening 24 so that the air toward the bottom of the greenhouse is drawn in first and this is the coolest air.

Because mixing of the cool incoming air and the coolest portions of the room air takes place in the confined mixing chamber 16 the air is substantially homogeneous before it enters the heater 28. This means that the heating of the air passing through the heater is accomplished more uniformly because this structure greatly reduces or substantially avoids passage of air into the heater in layers of different temperature with the cooler layers being substantially wholly outside air and the warmer air substantially entirely room air.

In the illustrated embodiment when the shutters 22 are open the flow of outside air through the mixing chamber 16 is substantially straight without having to pass around corners. This not only permits the fan 25 to operate more efficiently as there is less pressure drop across the chamber but it also creates a maximum syphon effect to draw room air into the chamber and mix it with the incoming fresh air. The room air is drawn into the chamber, of course, through the bottom opening 24. An important factor in this regard is that the incoming fresh air and the incoming room air are at a relatively great angle so that efficient turbulence of the two air streams occurs in the chamber for most efficient mixing.

Having described my invention as related to the embodiments shown in the accompanying drawings, it is my intention that the invention be not limited by any of the details of description, unless otherwise specified, but rather be construed broadly within its spirit and scope as set out in the accompanying claims.

We claim:

1. Apparatus for conditioning the air of a space means defining an enclosed space having a top and a bottom, comprising: an enclosure having an air mixing chamber therein; exterior air inlet means to said enclosure from externally of said space; space air inlet means to said enclosure from said space; an air inlet duct depending from said enclosure and communicating with said space air inlet means of said enclosure, said duct having an intake opening spaced below said enclosure and nearer said space bottom than said enclosure; an exit passage means from said enclosure for passage of air therefrom; an air moving blower means having an inlet means for exhausting air through said exit passage means from said enclosure; an air heater receiving air from said blower means and having an air outlet passage; and an air distributing duct extending from said heater outlet passage into said space and having air openings for supplying air from said blower means into said space by way of said duct.

2. Apparatus for conditioning the air of a space means defining an enclosed space having a top and a bottom, comprising: an enclosure having an air mixing chamber therein; exterior air inlet means to said enclosure from externally of said space; space air inlet means to said enclosure from said space; an exit passage means from said enclosure for passage of air therefrom; an air moving blower means having an inlet means for exhausting air through said exit passage means from said enclosure; a fuel burning air heater evolving carbon dioxide rich gaseous combustion products, said heater receiving air from said air mixing chamber by way of said blower means and said heater having an air outlet passage; an air distributing duct extending from said heater outlet passage into said space and having air openings for supplying air from said blower means into said space by way of said duct; conduit means for conveying said carbon dioxide rich combustion products directly from said heater to said exterior without substantial mixing with air in said space means; and means for directing said carbon dioxide rich combustion products to the air mixing chamber of said enclosure on the inlet side of said blower means for distribution of said combustion products mixed with air from said air mixing chamber to said space by way of said air distributing duct.

3. The apparatus of claim 2 wherein said conduit means comprises a combustion products exit conduit from said heater to the exterior of said space, a combustion products supply conduit from said heater to said enclosure, said valve means for selectively directing said combustion products through one of said exit conduit and supply conduit.

4. The apparatus of claim 2 wherein there is provided an air inlet duct communicating with said space air inlet means of said enclosure having an air intake opening spaced below said enclosure and nearer said space bottom than said enclosure.

References Cited

UNITED STATES PATENTS

| | | | | |
|---|---|---|---|---|
| 2,532,737 | 12/1950 | Simpson | | 98—33 R |
| 3,348,922 | 10/1967 | Bose et al. | | 126—10 |
| 3,404,618 | 10/1968 | Jacobs | | 98—39 X |
| 3,246,643 | 4/1966 | Stark et al. | | 98—33 |
| 3,307,469 | 3/1967 | Bohanon | | 98—33 |
| 3,383,179 | 5/1968 | Tibbitts | | 236—49 |

LLOYD L. KING, Primary Examiner